(12) United States Patent
Hakiri et al.

(10) Patent No.: US 6,786,959 B2
(45) Date of Patent: Sep. 7, 2004

(54) PIGMENT DISPERSION, METHOD FOR PREPARING THE PIGMENT DISPERSION, INKJET INK USING THE PIGMENT DISPERSION, METHOD FOR PREPARING THE INKJET INK, INK CARTRIDGE CONTAINING THE INKJET INK, IMAGE FORMING METHOD AND APPARATUS USING THE INKJET INK, AND PRINT IMAGE PRODUCED BY THE IMAGE FORMING METHOD AND APPARATUS

(75) Inventors: Minoru Hakiri, Numazu (JP); Keishi Taniguchi, Susono (JP); Shin Hasegawa, Numazu (JP)

(73) Assignee: Ricoh Company Limited, Tokyo (JP)

( * ) Notice: Subject to any disclaimer, the term of this patent is extended or adjusted under 35 U.S.C. 154(b) by 0 days.

(21) Appl. No.: 10/418,133

(22) Filed: Apr. 18, 2003

(65) Prior Publication Data

US 2003/0196571 A1 Oct. 23, 2003

(30) Foreign Application Priority Data

Apr. 18, 2002 (JP) ........................................ 2002-115989

(51) Int. Cl.$^7$ ............................................. C09D 11/00
(52) U.S. Cl. ................................ 106/31.86; 106/31.75; 106/499
(58) Field of Search ......................... 106/31.86, 31.75, 106/499

(56) References Cited

U.S. PATENT DOCUMENTS

| 5,837,043 A | * | 11/1998 | Wong et al. | ............... 106/31.58 |
|---|---|---|---|---|
| 5,879,439 A | * | 3/1999 | Nagai et al. | ............... 106/31.28 |
| 6,051,628 A | * | 4/2000 | Bishop et al. | ............... 523/160 |
| 6,063,835 A | | 5/2000 | Ohshima et al. | |
| 6,231,652 B1 | * | 5/2001 | Koyano et al. | ........... 106/31.27 |
| 6,530,986 B2 | * | 3/2003 | Walker et al. | ............... 106/31.6 |
| 2003/0024439 A1 | * | 2/2003 | Shigeo et al. | ................ 106/503 |
| 2003/0121449 A1 | * | 7/2003 | Taniguchi et al. | ........ 106/31.58 |
| 2003/0130377 A1 | * | 7/2003 | Taniguchi et al. | ........... 523/160 |

FOREIGN PATENT DOCUMENTS

| EP | 000924272 A1 | * | 11/1998 | |
|---|---|---|---|---|
| JP | 56-147863 | | 11/1981 | |
| JP | 61-083267 | | 4/1986 | |
| JP | 05-105837 | | 4/1993 | |
| JP | 10-088050 | | 4/1998 | |
| JP | 10095946 A | * | 4/1998 | ........... C09D/11/10 |
| JP | 10-168367 | | 6/1998 | |

OTHER PUBLICATIONS

Derwent English Translation of JP 10–95946 A, Apr. 1998.*

* cited by examiner

Primary Examiner—Mark L. Bell
Assistant Examiner—Veronica F. Faison
(74) Attorney, Agent, or Firm—Oblon, Spivak, McClelland, Maier & Neustadt, P.C.

(57) ABSTRACT

A pigment dispersion including a pigment; a dispersant; and a dispersion medium including water, wherein the pigment is dispersed in the dispersion medium, wherein the average particle diameter D50 of the pigment is not greater than 50 nm and the standard deviation of the pigment particle diameter distribution thereof is less than the average particle diameter D50. An inkjet ink including the pigment dispersion and at least one of water, a water-soluble organic solvent and a surfactant. A method and apparatus for forming an image using the inkjet ink. An image produced by the image forming method and apparatus.

23 Claims, 1 Drawing Sheet

PIGMENT DISPERSION, METHOD FOR PREPARING THE PIGMENT DISPERSION, INKJET INK USING THE PIGMENT DISPERSION, METHOD FOR PREPARING THE INKJET INK, INK CARTRIDGE CONTAINING THE INKJET INK, IMAGE FORMING METHOD AND APPARATUS USING THE INKJET INK, AND PRINT IMAGE PRODUCED BY THE IMAGE FORMING METHOD AND APPARATUS

BACKGROUND OF THE INVENTION

1. Field of the Invention

The present invention relates to a pigment dispersion and an inkjet ink using the pigment dispersion. In addition, the present invention also relates to a method for preparing the pigment dispersion and the inkjet ink; an ink set using the inkjet ink; an ink cartridge containing the inkjet ink; an image forming method and apparatus using the inkjet ink; and an image produced by the image forming method and apparatus.

2. Discussion of the Background

Inkjet recording methods have the following advantages over other recording methods:

(1) The recording process thereof is relatively simple compared to other recording methods and therefore full color images can be easily produced; and (2) even when a printer having a simple constitution is used, high-resolution color images can be produced.

Dye-based inkjet inks in which a water-soluble dye is dissolved in water or a mixture solvent of water and an organic solvent have been typically used as inkjet inks. However, dye-based inkjet inks have a drawback in that the resultant images have poor light resistance, although the dye-based inkjet inks can produce color images having good chromaticness. Therefore, pigment-based inkjet inks in which one or more pigments such as carbon black and various organic pigments are dispersed have been investigated because of having a relatively good light resistance compared to the dye-based inkjet inks.

However, pigment-based inkjet inks have a drawback of frequently causing a clogging problem in that inkjet nozzles are clogged with the inks, resulting in formation of images having omissions and/or low density. In addition, pigment-based inkjet inks have a drawback in that the color gamut of images produced using the pigment-based inkjet inks is less than that of the images produced by dye-based inkjet inks.

Recently, a need exists for an inkjet ink in which a colorant having a small particle diameter is dispersed, to produce high resolution images. However, the smaller the pigment in an inkjet ink, the more frequently the inkjet ink (i.e., the pigment) is aggregated, resulting in deterioration of discharging stability of the inkjet ink. Therefore, an inkjet ink which includes a colorant having a small particle diameter and which has good discharge stability has not yet been developed.

In order to prevent the clogging problem and improve the color gamut of a pigment-based inkjet ink, the average particle diameter of the colorant of the ink has to be reduced. Therefore, conventional inkjet inks use a polymer-dispersant such as styrene-acrylic acid copolymers, styrene-maleic acid copolymers (disclosed in Unexamined Japanese Patent Application No. (hereinafter referred to as JP-A) 56-147863, etc.), and sodium naphthalenesulfonate-formalin condensation products (disclosed in JP-A 61-083267, etc.); or which use a surfactant such as polyethyleneglycol alkylphenyl ethers (disclosed in JP-A 05-105837, etc.), sulfates of polyethyleneglycol alkylphenyl ethers (disclosed in JP-A 10-168367, etc.), and phosphates of polyethyleneglycol alkylphenyl ethers (disclosed in JP-A 10-88050, etc.). However, each of such inkjet inks has a large average particle diameter, and in addition the inkjet inks have poor discharge stability and preservation stability. In addition, the images produced by the inkjet inks have poor clearness.

Because of these reasons, a need exists for a pigment-based inkjet ink which has good discharge stability and a preservation stability and which can produce images having good clearness.

SUMMARY OF THE INVENTION

Accordingly, an object of the present invention is to provide a pigment dispersion for use in a pigment-based inkjet ink which has good discharge stability and a preservation stability and which can produce images having good clearness (high chromaticness).

Another object of the present invention is to provide an inkjet ink, an inkjet ink set, an ink cartridge, and an image forming method and apparatus, by which color images having good light resistance and good clearness (high chromaticness) can be produced without causing the clogging problem.

Yet another object of the present invention is to provide methods for preparing the pigment dispersion and the inkjet ink.

Briefly these objects and other objects of the present invention as hereinafter will become more readily apparent can be attained by a pigment dispersion including:

a pigment;

a dispersant; and a dispersion medium including water, wherein the pigment is dispersed in the dispersion medium, wherein the pigment has an average particle diameter D50 not greater than 50 nm and a pigment particle diameter distribution, and wherein a standard deviation of the pigment particle diameter distribution is less than the average particle diameter D50.

The dispersant is preferably included in the pigment dispersion in an amount of from 0.3 to 0.2 parts by weight per 1 part by weight of the pigment.

The pigment preferably includes a compound having the following formula (1):

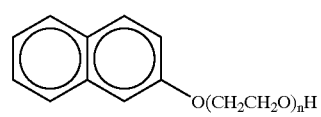

(1)

wherein n is an integer of from 20 to 100. More preferably n is 40.

It is preferable that the pigment includes one of Pigment Red 122, Pigment Blue 15:3, and Pigment Yellow 138.

As another aspect of the present invention, a method for preparing a pigment dispersion is provided which includes:

mixing a pigment, a dispersant, and a dispersion medium including water, wherein the weight ratio (P/D) of the pigment (P) to the dispersant (D) is from 1/0.3 to 1/2; and subjecting the mixture to a wet dispersion treatment to prepare a pigment dispersion, wherein the pigment dispersion is the pigment dispersion mentioned above.

As yet another aspect of the present invention, an inkjet ink is provided which includes the pigment dispersion, and one or more additives such as water, water-soluble organic solvents and surfactants. A fluorine-containing surfactant is preferably added thereto.

As a further aspect of the present invention, a method for preparing an inkjet ink is provided which includes mixing the above-mentioned pigment dispersion and at least one of water, a water-soluble organic solvent and a surfactant.

As a still further aspect of the present invention, an inkjet ink set is provided which includes plural inkjet inks having different color tones, wherein each of the plural inkjet inks is the inkjet ink of the present invention.

As a still further aspect of the present invention, an ink cartridge is provided which includes a container and an ink which is contained in the container, wherein the ink is the inkjet ink of the present invention.

As a still further aspect of the present invention, an inkjet printer is provided which includes:

an ink cartridge containing an ink; and an inkjet print head configured to discharge the ink to form an image on a receiving material, wherein the ink is the inkjet ink of the present invention.

As a still further aspect of the present invention, an inkjet printing method is provided which includes:

discharging an ink from a nozzle to form an image on a receiving material, wherein the ink is the inkjet ink of the present invention.

As a still further aspect of the present invention, an image which is produced on a receiving material by the image forming method or apparatus is provided. The receiving material is preferably a paper.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
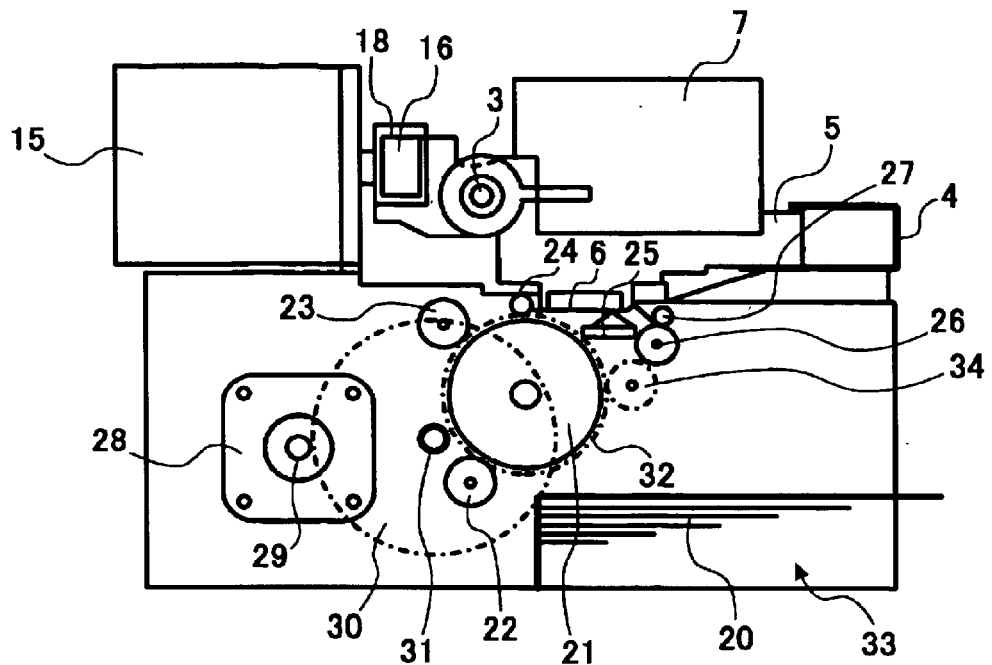
FIG. 1 is a schematic view illustrating the cross section of an embodiment of the image forming apparatus of the present invention.

The present inventors discover that the above-identified objects can be attained by a pigment dispersion for an inkjet ink, in which a colorant included therein is in the specified dispersion condition mentioned above and which includes a dispersant in a relatively large amount compared to that in conventional inkjet inks.

The present invention will be explained in detail. The feature of the pigment dispersion and inkjet ink of the present invention is that the average particle diameter (D50) of a pigment dispersed therein is not greater than 50 nm, and the dispersed pigment has a particle diameter distribution such that the standard deviation of the particle diameter distribution is less than the average particle diameter (D50) The average particle diameter (D50) of the pigment dispersed therein is preferably not greater than 30 nm. When the average particle diameter is too large, the chromaticness of the resultant color image deteriorates.

The average particle diameter (D50) and standard deviation of the particle diameter distribution can be measured by various methods, and in the present invention they are measured using a particle analyzer UPA 150 manufactured by Nikkiso Co., Ltd. When the particle diameter distribution of a dispersed pigment is measured using UPA 150, the value sd determined by the analyzer is the standard deviation of the particle diameter distribution of the pigment.

The average particle diameter (D50) and standard deviation can be preferably controlled by optimizing the dispersion conditions such as dispersion time (the time during which the liquid to be dispersed stays in a dispersing machine) speed of the dispersion media, the amount of applied shear stress, surface conditions of dispersion media (surface roughness and curvature of the surface of dispersion media such as beads, etc.), and the like factors. When a pigment dispersion is prepared using a bead mill, it is preferable that the particle diameter of dispersion media (i.e., beads) is controlled. Specifically, in order to prepare a pigment dispersion in which a colorant (i.e., a pigment) is dispersed while having an average particle diameter not greater than 50 nm, it is preferable to use beads having a particle diameter of from 0.1 mm to 1.0 mm while the dispersion time is controlled so as to be from 1 to 100 hours per 1 litter of the dispersion. By using such a dispersion method, the standard deviation of the particle diameter distribution of the resultant pigment dispersion can be made to be smaller than the average particle diameter (D50) of the pigment.

In addition, it is preferable that a dispersant is included in the pigment dispersion in an amount of from 0.3 to 2 parts by weight, and more preferably from 0.5 to 2 parts by weight, per 1 part by weight of the pigment included therein. By adding a dispersant in such an amount in the pigment dispersion, the resultant pigment dispersion has a standard deviation of particle diameter distribution smaller than the average particle diameter of the pigment dispersed therein, i.e., the resultant inkjet ink has good discharge stability and preservation stability and can produce images having high chromaticness.

When the addition amount of a dispersion is too small, the above-mentioned effects cannot be produced. In addition, the resultant pigment dispersion and inkjet ink have poor preservation stability, and thereby the clogging problem tends to be caused. In contrast, when the addition amount is too large, the viscosity of the resultant dispersion and inkjet ink seriously increases, and thereby it becomes impossible to form images (i.e., the ink is not easily discharged from nozzles).

The dispersant for use in the dispersion and inkjet ink of the present invention is not particularly limited. However, it is preferable to use a compound having the following formula (1):

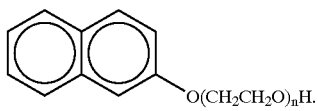

By using a compound having formula (1) as a dispersant, a pigment dispersion and an inkjet ink having a small average particle diameter and a small standard deviation can be easily prepared.

In formula (1), n is preferably an integer of from 20 to 100, and more preferably from 30 to 50. When n is too small, the dispersion stability of the resultant pigment dispersion and inkjet ink deteriorates. In contrast, when n is too large, the viscosity of the resultant pigment dispersion and inkjet ink seriously increases. It is most preferable that the compound is a polyoxyethylene (n=40) β-naphthyl ether.

Specific examples of the pigments for use in the pigment dispersion and inkjet ink of the present invention include known black color pigments and color pigments.

Specific examples of the black color pigments include carbon blacks such as furnace black, and channel black; powders including one or more metals such as copper powders, iron powders and titanium oxide powders; and organic pigments such as o-nitroaniline black and the like.

Specific examples of the yellow pigments include Pigment Yellows 1, 2, 3, 12, 13, 14, 16, 17, 73, 74, 75, 83, 93, 95, 97, 98, 114, 120, 128, 129, 138, 150, 151, 154, 155, 180, etc.

Specific examples of the magenta pigments include Pigment Reds 5, 7, 12, 48 (Ca), 48 (Mn), 57 (Ca), 57:1, 112, 122, 123, 168, 184, 202, etc.; Pigment Violet 19; etc.

Specific examples of the cyan pigments include Pigment Blues 1, 2, 3, 15, 15:3, 15:4, 16, 22 and 60; Vat Blue 4 and 60; etc.

Specific examples of other color pigments include toluidine red, Permanent Carmine FB, Fast Yellow AAA, Disazo Orange PMP, Lake Red C, Brilliant Carmine 6B, Phthalocyanine Blue, Quinacridone Red, Dioxane Violet, Victoria Pure Blue, Alkali Blue Toner, Fast Yellow 10G, Disazo Yellow AAMX, Disazo Yellow AAOT, Disazo Yellow AAOA, yellow iron oxide, Disazo Yellow HR, o-nitroaniline orange, dinitroaniline orange, Vulcan Orange, chlorinated Para Red, Brilliant Fast Scarlet, Naphthol Red 23, Pyrazolone red, Barium Red 2B, Calcium Red 2B, Strontium Red 2B, Manganese Red 2B, Barium Rithol Red, Pigment Scarlet 3B Lake, Lake Bordeaux 10B, Anthocyne 3B Lake, Anthocyne 5B Lake, Rhodamine 6G Lake, Eosin Lake, red iron oxide, Fanatol Red FGR, Rhodamine B Lake, Methyl Violet Lake, dioxazine violet, Basic Blue 5B Lake, Basic Blue 6G Lake, Fast Sky Blue, Alkali Blue R Toner, Peacock Blue Lake, Prussian Blue, ultramarine blue, Reflex Blue 2G, Reflex Blue R, Brilliant Green Lake, Diamond Green, Thioflavine Lake, Phthalocyanine Green G, Green Gold, Phthalocyanine Green Y, iron oxide powders, red rust, zinc oxide, titanium oxide, calcium carbonate, clay, barium sulfate, alumina, alumina white, aluminum powders, bronze powders, fluorescent pigments, pearl pigments, Naphthol Carmine FB, Naphthol Red M, Fast Yellow G, Disazo Yellow AAA, dioxane violet, Alkali Blue G Toner and the like. In addition, process pigments which are prepared by grafting a resin on a pigment can also be used. These pigments can be used alone or in combination.

Among these pigments, Pigment Yellow 138, Pigment Red 122 and Pigment Blue 15:3 are preferably used as a yellow color pigment, a magenta color pigment and a cyan color pigment, respectively, because of having a good color tone, and good light resistance, i.e., because the resultant color inks have well-balanced properties.

The pigment content of the pigment dispersion of the present invention is preferably from 5 to 30% by weight. When the pigment content is too low, the productivity of the pigment dispersion is low. In contrast, when the pigment content is too high, the viscosity of the resultant pigment dispersion seriously increases, and thereby the pigment cannot be well dispersed.

The pigment dispersion of the present invention can include one or more additives. For example, water soluble organic solvents can be added.

Specific examples of such water soluble organic solvents for use in the pigment dispersion and inkjet ink include alcohols such as methanol, ethanol, 1-propanol, and 2-propanol; polyhydric alcohols such as ethylene glycol, diethyleneglycol, triethyleneglycol, and glycerin; pyrrolidone derivatives such as N-methyl pyrrolidone and 2-pyrrolidone; ketones such as acetone and methyl ethyl ketone; and alkanol amines such as monoethanol amine, diethaol amine and triethanol amine.

Among these organic solvents, polyhydric alcohols such as diethylene glycol, triethylene glycol and glycerin are preferable to prevent the clogging problem. Namely, by including one or more of such organic solvents to the pigment dispersion and the inkjet ink, occurrence of discharging problems such as the clogging problem can be prevented because drying of the inkjet ink (i.e., evaporation of water) can be prevented. In addition, the resultant inkjet ink has good preservation stability.

Further, surfactants such as nonionic surfactants, anionic surfactants, cationic surfactants and amphoteric surfactants; antiseptics; etc. can be added to the pigment dispersion and inkjet ink of the present invention.

Specific examples of the nonionic surfactants include polyoxyethylene alkylphenyl ethers, polyoxyethylene alkyl ethers, esters of fatty acids with polyoxyethylene, esters of fatty acids with sorbitan, esters of fatty acids with polyoxyethylenesorbitan, esters of fatty acids with polyoxyethyleneglycerin, esters of fatty acids with polyglycerin, esters of fatty acids with polyoxyethylenesorbit, polyoxyethylene sterol, polyoxyethylenepolyoxypropylene alkyl ethers, polyoxyethylene fatty acids amides, polyoxyethylene-polyoxypropylene block copolymers, tetramethyldecynediol, adducts of tetramethyldecynediol with ethylene oxide, etc.

Specific examples of the anionic surfactants include alkylbenzene sulfonates, alkylphenyl sulfonates, alkylnaphthalene sulfonates, higher fatty acid salts, sulfates of higher fatty acid esters, sulfonates of higher fatty acid esters, sulfates of higher alcohol ethers, sulfonates of higher alcohol ethers, salts of higher alkylsulfosuccinic acid, condensation products of naphthalenesulfonates with formalin, salts of polystyrene sulfonic acids, salts of polyacrylic acid, salts of polyoxyalkylene alkyl ether phosphoric acids, salts of polyoxyalkylene alkyl ether carboxylic acids, salts of alkylsulfuric acids, acrylic acid-acrylate copolymers, etc.

In addition, silicone-based surfactants such as adducts of polysiloxane with polyoxyethylene; fluorine-containing surfactants such as perfluoroalkyl carboxylates, perfluoroalkyl sulfonates, and oxyethylene perfluoroalkyl ethers; and bio surfactants such as spiculisporic acid, rhamnolipid, and lysolecithin, can also be used.

The addition amount of the surfactants is preferably from 0.1 to 5.0% by weight, and more preferably from 0.5 to 3.0% by weight, based on the total weight of the pigment dispersion or inkjet ink.

The pigment dispersion of the present invention can be prepared by mixing a pigment, a dispersant and a dispersion medium including water, and optionally additives, and dispersing the mixture using a known dispersing machine such as sand mills, ball mills, roll mills, bead mills, NANOMIZER, and HOMOGENIZER (i.e., subjecting the mixture to a wet dispersion treatment). In this case, it is preferable that the addition amount of the dispersant is from 0.3 to 2 parts by weight per 1 part by weight of the pigment included therein.

The inkjet ink of the present invention preferably includes a fluorine-containing surfactant. Suitable fluorine-containing surfactants include sodium salts of fluoroalkylbenzene sulfonic acids, fluoroalkylphosphonic acid, sodium salts of fluoroalkyl carboxylic acids, fluoroalkyl polyoxyethylene ether, fluoroalkyl ammonium iodide, fluoroalkyl betaine, etc. Among these fluorine-containing surfactants, anionic fluorine-containing surfactants such as fluoroalkylbenzene sulfonic acid sodium salts are particularly preferable.

The addition amount of such fluorine-containing surfactants is from 0.1 to 5.0% by weight, and more preferably from 0.5 to 3.0% % by weight, based on the total weight of the ink.

The thus prepared pigment dispersion is preferably used for pigment-based inkjet inks.

The pigment-based inkjet inks of the present invention can be typically prepared by the following method:

(1) the pigment dispersion prepared above, and other additives such as water, water-soluble organic solvents, and surfactants are mixed while agitating;
(2) the mixture is subjected to a filtering treatment, a centrifugal treatment or the like treatment to remove coarse particles therefrom; and
(3) then the mixture is deaerated.

The pigment content of the inkjet ink is preferably from 1 to 7% by weight. When the pigment content is too low, the resultant print images have poor clearness because of having low image density. In contrast, when the pigment content is too high, the viscosity of the resultant inkjet ink seriously increases and thereby the inkjet ink tends to cause the clogging problem.

The inkjet ink of the present invention may include one or more of the additives mentioned above for use in the pigment dispersion, if desired.

For example, the water-soluble organic solvents can be added to the inkjet ink in an amount of from 0 to 50% by weight, more preferably from 5 to 40% by weight, and even more preferably from 10 to 35% by weight, based on the total weight of the inkjet ink.

The thus prepared pigment-based inkjet ink can be preferably used for an ink set and an ink cartridge which include plural color inks each having a different color tone and which is used for forming multi-color images.

In addition, the pigment-based inkjet ink of the present invention can be used for an inkjet printer which discharges one or more inks toward a receiving material such as papers to record an image on the receiving material.

The inkjet ink of the present invention can be used for continuously-projecting type inkjet printing methods (apparatus) and on-demand type inkjet printing methods (apparatus). The on-demand type inkjet printing methods include piezoelectric inkjet recording methods, thermal inkjet recording methods and electrostatic inkjet recording methods.

An embodiment of the inkjet recording apparatus of the present invention is illustrated in FIG. 1. The inkjet recording apparatus has a platen roller 21 configured to feed a receiving paper 20 in a sub-scanning direction (i.e., in a direction B as illustrated in FIG. 2); feed rollers 22 and 23 which are arranged so as to contact the platen 21; a pinch roller 24 configured to feed the receiving paper 20 to a predetermined direction; a guide plate 25 facing a recording head 6; a paper discharge roller 26 which is located downstream from the recording head 6 relatively to the paper feeding direction; and a spur roller 27 which is pressed to the paper discharge roller 26.

The rotation of a sub-scanning motor 28 having a stepping motor is transmitted to the platen 21 via gears 29, 30 and 31 and a platen gear 32 to rotate the platen 21. When the platen 21 rotates, the paper 20 contained in a paper feeding section 33 is fed to the space between the recording head 6 and the guide plate 25 via the nip between the platen 21 and the feed rollers 22 and 23 and the nip between the platen 21 and the pinch roller 24. The receiving paper 20 is fed in the direction B by the discharge roller 26 and the spur roller 27, which are rotated by a gear 34 engaging the platen gear 32.

Figure 2:
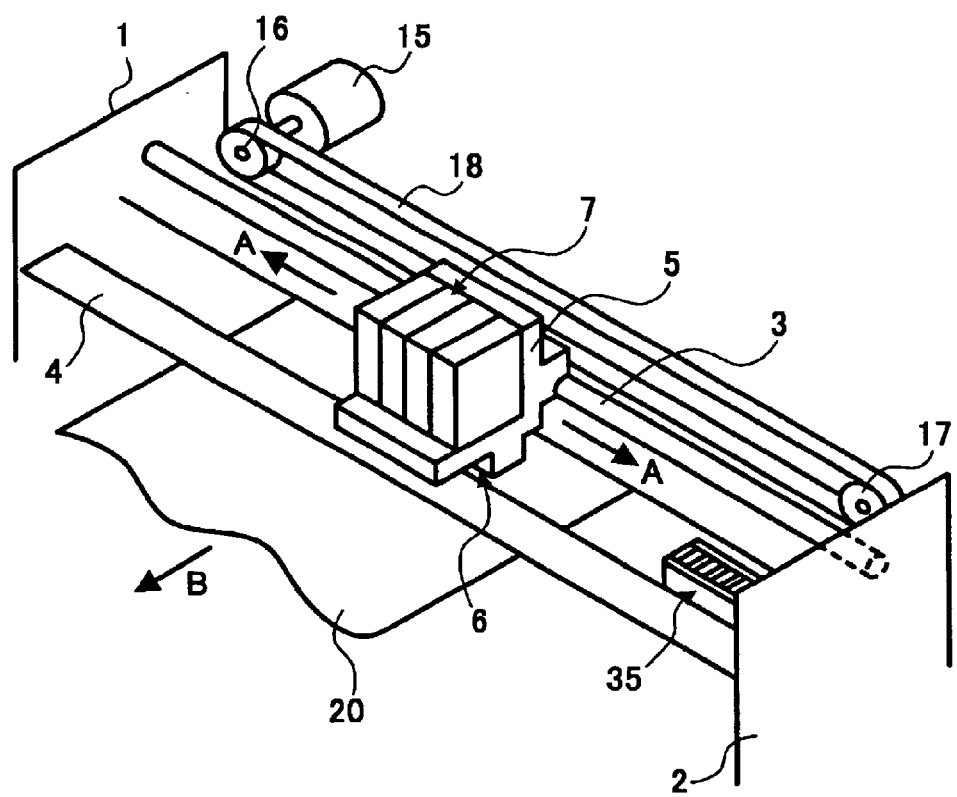
FIG. 2 is a perspective view illustrating the main part of the image forming apparatus of the present invention as shown in FIG. 1.

In the main recording section as shown in FIG. 2, guide rods 3 and 4, which are supported by side plates 1 and 2, support a carriage 5 such that the carriage 5 can be slid in the main scanning direction (i.e., in a direction A). On the lower surface of the carriage 5, the recording head 6 having an inkjet head is provided such that ink drops are discharged downward. On the upper surface of the carriage 5, a cartridge 7 which supplies inks to the recording head 6 is arranged.

In the recording head 6, a head discharging a yellow ink, a head discharging a magenta ink, a head discharging a cyan ink and a head discharging a black ink are serially arranged in the main scanning direction. The carriage 5 is connected with a timing belt 18 which is supported while stretched by a driving pulley 16 and driven pulley 17 which are rotated by a main scanning motor 15 having a stepping motor. By controlling the driving of the main scanning motor 15, the carriage 5, i.e., the recording head 6, is moved in the main scanning direction. In FIG. 2, numeral 35 denotes a head cleaner.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1
Preparation of Pigment Dispersion (A)

The following components were mixed.

| | |
|---|---|
| Pigment red 122 | 150 |
| (FASTOGEN SUPER MAGENTA RG from Dainippon Ink & Chemicals Inc.) | |
| Compound having formula (1) (dispersant) (n = 40) | 110 |
| Wetting agent | 2 |
| (PAIONIN D-1107S from TAKEMOTO OIL & FAT CO., LTD.) | |
| Distilled water | 738 |

The mixture was subjected to a wet dispersion treatment for 2 hours using a disk-type bead mill KDL, which was manufactured by Shinmaru Enterprises Corporation), while the mixture was circulated.

Thus a pigment dispersion (A) was prepared.
Preparation of inkjet ink (a)
The following components were mixed.

| | |
|---|---|
| Pigment dispersion (A) | 40.0 |
| (pigment content of 15% by weight) | |
| Glycerin | 7.5 |
| Diethylene glycol | 22.5 |
| 2-Ethyl-1,3-hexanediol | 3.0 |
| 2-Pyrrolidone | 3.0 |
| Sodium salt Polyoxyethylene (3) alkyl (C13) ether acetic acid | 0.45 |
| Distilled water | 73.55 |

The mixture was agitated for 30 minutes, and then subjected to filtering using a Membrane filter having openings of 0.8 µm. Then the liquid was deaerated in a vacuum.

Thus, an inkjet ink (a) was prepared.

EXAMPLE 2

Preparation of Pigment Dispersion (B)

The procedure for preparation of the pigment dispersion (A) in Example 1 was repeated except that Pigment Red was replaced with the following pigment.

Pigment Blue 15:3 150

(LIONOL BLUE FG-7351 from Toyo Ink Mfg. Co., Ltd.)

Thus, a pigment dispersion (B) was prepared.
Preparation of inkjet ink (b)

The procedure for preparation of the inkjet ink (a) was repeated except that the pigment dispersion (A) was replaced with the pigment dispersion (B).

Thus, an inkjet ink (b) was prepared.

EXAMPLE 3

Preparation of Pigment Dispersion (C)

The procedure for preparation of the pigment dispersion (A) in Example 1 was repeated except that Pigment Red was replaced with the following pigment.

Pigment Yellow 138 150

(LIONOGEN YELLOW 1010 from Toyo Ink Mfg. Co., Ltd.)

Thus, a pigment dispersion (C) was prepared.
Preparation of inkjet ink (c)

The procedure for preparation of the inkjet ink (a) was repeated except that the pigment dispersion (A) was replaced with the pigment dispersion (C).

Thus, an inkjet ink (c) was prepared.

EXAMPLE 4

Preparation of Pigment Dispersion (D)

The procedure for preparation of the pigment dispersion (A) in Example 1 was repeated except that the dispersion was performed for 3 hours.

Thus, a pigment dispersion (D) was prepared.
Preparation of inkjet ink (d)

The procedure for preparation of the inkjet ink (a) was repeated except that the pigment dispersion (A) was replaced with the pigment dispersion (D).

Thus, an inkjet ink (d) was prepared.

EXAMPLE 5

Preparation of Pigment Dispersion (E)

The procedure for preparation of the pigment dispersion (A) in Example 1 was repeated except that the dispersion was performed for 4 hours.

Thus, a pigment dispersion (E) was prepared.

Preparation of inkjet ink (e)

The procedure for preparation of the inkjet ink (a) was repeated except that the pigment dispersion (A) was replaced with the pigment dispersion (E).

Thus, an inkjet ink (e) was prepared.

EXAMPLE 6

Preparation of Pigment Dispersion (F)

The procedure for preparation of the pigment dispersion (A) in Example 1 was repeated except that the addition amounts of the compound having formula (1) and distilled water were changed to 170 parts and 67 parts, respectively.

Thus, a pigment dispersion (F) was prepared.
Preparation of inkjet ink (f)

The procedure for preparation of the inkjet ink (a) was repeated except that the pigment dispersion (A) was replaced with the pigment dispersion (F).

Thus, an inkjet ink (f) was prepared.

EXAMPLE 7

Preparation of Pigment Dispersion (G)

The procedure for preparation of the pigment dispersion (A) in Example 1 was repeated except that the addition amounts of the compound having formula (1) and distilled water were changed to 60 parts and 788 parts, respectively.

Thus, a pigment dispersion (G) was prepared.
Preparation of inkjet ink (g)

The procedure for preparation of the inkjet ink (a) was repeated except that the pigment dispersion (A) was replaced with the pigment dispersion (G).

Thus, an inkjet ink (g) was prepared.

Comparative Example 1

Preparation of Pigment Dispersion (H)

The procedure for preparation of the pigment dispersion (A) in Example 1 was repeated except that the dispersion was performed for 0.7 hours.

Thus, a pigment dispersion (H) was prepared.
Preparation of inkjet ink (h)

The procedure for preparation of the inkjet ink (a) was repeated except that the pigment dispersion (A) was replaced with the pigment dispersion (H).

Thus, an inkjet ink (h) was prepared.

Comparative Example 2

Preparation of Pigment Dispersion (I)

The procedure for preparation of the pigment dispersion (A) in Example 2 was repeated except that the dispersion was performed for 0.7 hours.

Thus, a pigment dispersion (I) was prepared.
Preparation of inkjet ink (i)

The procedure for preparation of the inkjet ink (a) was repeated except that the pigment dispersion (A) was replaced with the pigment dispersion (I).

Thus, an inkjet ink (i) was prepared.

Comparative Example 3

Preparation of Pigment Dispersion (J)

The procedure for preparation of the pigment dispersion (A) in Example 3 was repeated except that the dispersion was performed for 0.7 hours.

Thus, a pigment dispersion (J) was prepared.
Preparation of inkjet ink (j)

The procedure for preparation of the inkjet ink (a) was repeated except that the pigment dispersion (A) was replaced with the pigment dispersion (J).

Thus, an inkjet ink (j) was prepared.

Comparative Example 4
Preparation of Pigment Dispersion (K)

The procedure for preparation of the pigment dispersion A in Example 1 was repeated except that the formula of the pigment dispersion was changed to the following:

| | |
|---|---|
| Pigment Red 122 (TONER MAGENTA E02 from Clariant Japan K.K.) | 150 |
| Compound having formula (1) (dispersant) (n = 130) | 110 |
| Wetting agent (PAIONIN D-1107S from TAKEMOTO OIL & FAT CO., LTD.) | 2 |
| Distilled water | 738 |

Preparation of inkjet ink (k)

The procedure for preparation of the inkjet ink (a) was repeated except that the pigment dispersion (A) was replaced with the pigment dispersion (K).

Thus, an inkjet ink (k) was prepared.

Comparative Example 5
Preparation of Pigment Dispersion (L)

The procedure for preparation of the pigment dispersion (A) in Example 1 was repeated except that the addition amounts of the compound having formula (1) and distilled water were changed to 30 parts and 818 parts, respectively.

Thus, a pigment dispersion (L) was prepared
Preparation of inkjet ink (l)

The procedure for preparation of the inkjet ink (a) was repeated except that the pigment dispersion (A) was replaced with the pigment dispersion (L).

Thus, an inkjet ink (l) was prepared.

Comparative Example 6
Preparation of Pigment Dispersion (M)

The procedure for preparation of the pigment dispersion (A) in Example 1 was repeated except that the addition amounts of the compound having formula (1) and distilled water were changed to 400 parts and 448 parts, respectively.

Thus, a pigment dispersion (M) was prepared.
Preparation of inkjet ink (m)

The procedure for preparation of the inkjet ink (a) was repeated except that the pigment dispersion (A) was replaced with the pigment dispersion (M).

Thus, an inkjet ink (m) was prepared.

EXAMPLE 8
Preparation of inkjet ink (e2)

The procedure for preparation of the inkjet ink (a) in Example 1 was repeated except that the formula of the inkjet ink was changed to the below-mentioned formula 2 and the pigment dispersion (E) was used as the pigment dispersion.
Formula 2 of inkjet ink (e2)

| | |
|---|---|
| Pigment dispersion (E) (pigment content of 15% by weight) | 40.0 |
| Glycerin | 7.5 |
| Diethylene glycol | 22.5 |
| 2-Ethyl-1,3-hexanediol | 3.0 |
| 2-Pyrrolidone | 3.0 |
| Fluorine-containing surfactant (PRTHARGENT 110 from NEOS) | 3.0 |
| Distilled water | 71.0 |

Thus, an inkjet ink (e2) was prepared.

Evaluation of Pigment Dispersions and Inkjet Inks

1. Average Particle Diameter

The average particle diameter (D50) and particle diameter distribution of each of the pigment dispersions (A) to (M) was measured using a particle analyzer UPA150 manufactured by Nikkiso Co., Ltd. The standard deviation (sd) of each of the pigment dispersions (A) to (M) was determined from the particle diameter distribution thereof. In addition, the average particle diameter (D50) of each of the inkjet inks (a) to (m) was measured using the particle analyzer UPA150.

2. Discharge Stability

Each of the inkjet inks (a) to (m) was set in an inkjet printer MJ-930C manufactured by Seiko Epson Corp., to record images on a plain paper, 4024 paper from Xerox Corp. Then the ink was allowed to settle under conditions of 40° C. for 1 month while a cap was set on the printer head. After the preservation, images were recorded to determine whether images could be recorded without problems. Thus, the discharging stability of the ink was evaluated.

The discharge stability of the inks was graded as follows.

◯: The first image could be recorded without any problem.

Δ: A normal image could be recorded after recording two or three images.

: A normal image could not be recorded even after recording three images.

3. Image Qualities

The image qualities of the above-prepared images were evaluated with respect to the following items:

(1) Image density (ID)

The image density of a solid image provided by each ink was measured with a densitometer manufactured by X-rite.

(2) Clearness (chromaticness)

The color data of each image were plotted in a chromaticity coordinate to determine $\sqrt{(a^2+b^2)}$, i.e., the chromaticness of the image.

4. Preservability of Ink

Each ink was set in a polyethylene container while the container was sealed. The container was preserved at 70° C. for three weeks. The particle diameter, surface tension, and viscosity of each ink were measured before and after the preservation test to determine the preservability of the ink.

The preservability of the ink is graded as follows:

◯: The variation of the properties of the inks before and after the preservation test is within 10%.

Δ: The variation is within 30%.

: The variation is greater than 30%.

The results are shown in Table 1.

TABLE 1

| Dispersion/Ink | Pigment Dispersion D50 (nm) | sd (nm) | Inkjet ink D50 (nm) | Clearness | ID | Discharge stability | Preservability |
|---|---|---|---|---|---|---|---|
| Ex. 1 (A)/(a) | 45.4 | 28.3 | 45.7 | 50 | 0.88 | ○ | ○ |
| Ex. 2 (B)/(b) | 46.2 | 37.5 | 46.3 | 45 | 0.97 | ○ | ○ |
| Ex. 3 (C)/(c) | 43.2 | 35.5 | 43.5 | 74 | 0.87 | ○ | ○ |
| Ex. 4 (D)/(d) | 25.6 | 22.4 | 25.7 | 54 | 0.96 | ○ | ○ |
| Ex. 5 (E)/(e) | 9.8 | 3.2 | 9.8 | 58 | 1.02 | ○ | ○ |
| Ex. 6 (F)/(f) | 46.5 | 31.2 | 46.6 | 49 | 0.87 | ○ | ○ |
| Ex. 7 (G)/(g) | 45.3 | 29.2 | 45.8 | 50 | 0.88 | ○ | ○ |
| Ex. 8 (E)/(e2) | 9.8 | 3.1 | 9.9 | 62 | 1.06 | ○ | ○ |
| Comp. Ex. 1 (H)/(h) | 72.5 | 65.3 | 72.8 | 42 | 0.80 | ○ | ○ |
| Comp. Ex. 2 (I)/(I) | 75.5 | 60.4 | 75.6 | 37 | 0.90 | ○ | ○ |
| Comp. Ex. 3 (J)/(j) | 68.9 | 72.6 | 69.1 | 65 | 0.75 | ○ | ○ |
| Comp. Ex. 4 (K)/(k) | 63.2 | 65.3 | 63.5 | 43 | 0.82 | Δ | Δ |
| Comp. Ex. 5 (L)/(l) | 44.3 | 54.6 | 44.7 | 49 | 0.86 | Δ | |
| Comp. Ex. 6 (M)/(m) | 68.9 | 72.3 | 69.1 | 47 | 0.84 | Δ | Δ |

As can be understood from Table 1, the inkjet inks of the present invention have good discharging stability and preservability and can produce images having good clearness (i.e., high chromaticness).

This document claims priority and contains subject matter related to Japanese Patent Application No. 2002-115989, filed on Apr. 18, 2002, incorporated herein by reference.

Having now fully described the invention, it will be apparent to one of ordinary skill in the art that many changes and modifications can be made thereto without departing from the spirit and scope of the invention as set forth therein.

What is claimed is:

1. A pigment dispersion, comprising:
   a pigment;
   a dispersant; and
   a dispersion medium comprising water,
   wherein said pigment is dispersed in said dispersion medium;
   wherein an average particle diameter D50 of said pigment is not greater than 50 nm and a standard deviation of a particle diameter distribution of said pigment is less than said average particle diameter D50.

2. The pigment dispersion according to claim 1, wherein said dispersant is included in said pigment dispersion in an amount of from 0.3 to 2 parts by weight per 1 part by weight of said pigment.

3. The pigment dispersion according to claim 1, wherein said dispersant comprises a compound having the following formula (1)

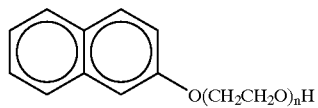

(1)

wherein n is an integer of from 20 to 100.

4. The pigment dispersion according to claim 3, wherein n is 40 in formula (1).

5. The pigment dispersion according to claim 1, wherein said pigment comprises Pigment Red 122.

6. The pigment dispersion according to claim 1, wherein said pigment comprises Pigment Blue 15:3.

7. The pigment dispersion according to claim 1, wherein said pigment comprises Pigment Yellow 138.

8. A method for preparing a pigment dispersion, comprising:
   mixing a pigment, a dispersant, and a dispersion medium comprising water to obtain a mixture, wherein a weight ratio (P/D) of said pigment (P) to said dispersant (D) is from 1/0.3 to 1/2; and
   subjecting said mixture to a wet dispersion treatment to prepare a pigment dispersion,
   wherein an average particle diameter D50 of said pigment in said pigment dispersion is not greater than 50 nm and a standard deviation of a particle diameter distribution of said pigment in said pigment dispersion is less than said average particle diameter D50.

9. The method according to claim 8, wherein said wet dispersion treatment is performed using a bead mill.

10. The method according to claim 9, wherein said bead mill comprises beads having a particle diameter of from 0.1 mm to 1.0 mm, and wherein said wet dispersion treatment is performed for a time of from 1 to 100 hours.

11. An inkjet ink, comprising:
    the pigment dispersion according to claim 1; and
    at least one member selected from the group consisting of water, a water-soluble organic solvent and a surfactant.

12. The inkjet ink according to claim 11, which comprises a fluorine-containing surfactant.

13. A method for preparing an inkjet ink, comprising:
    mixing the pigment dispersion according to claim 1 and at least one member selected from the group consisting of water, a water-soluble organic solvent, and a surfactant.

14. The method according to claim 13, wherein said mixing comprises:
    mixing the pigment dispersion and a fluorine-containing surfactant.

15. An inkjet ink set, comprising:
    a plurality of inkjet inks, each having a different color, wherein each of said plurality of inkjet inks is the inkjet ink according to claim 11.

16. An inkjet ink cartridge, comprising:

a container; and an inkjet ink according to claim 11 contained in said container.

17. An inkjet recording apparatus, comprising:

an ink cartridge containing the inkjet ink according to claim 11; and an inkjet print head configured to discharge the inkjet ink to form an image on a receiving material.

18. A method for recording an image, comprising:

discharging the inkjet ink according to claim 11 from a nozzle to form an image on a receiving material.

19. An image produced according to the method according to claim 18.

20. The image according to claim 19, wherein said receiving material is a paper.

21. An image produced by the inkjet recording apparatus according to claim 17.

22. The image according to claim 21, wherein said receiving material is a paper.

23. A pigment dispersion obtained by the method as claimed in claim 8.

* * * * *